March 17, 1925.

G. P. HAYNES 1,530,077

OIL AND WATER SEPARATING MEANS

Filed Dec. 9, 1922  3 Sheets-Sheet 3

Inventor
George P. Haynes
By his Attorneys

Patented Mar. 17, 1925.

1,530,077

UNITED STATES PATENT OFFICE.

GEORGE P. HAYNES, OF NEW YORK, N. Y., ASSIGNOR TO TODD SHIPYARDS CORPORATION, OF NEW YORK, N. Y., A CORPORATION OF NEW YORK.

OIL AND WATER SEPARATING MEANS.

Application filed December 9, 1922. Serial No. 605,905.

*To all whom it may concern:*

Be it known that I, GEORGE P. HAYNES, a citizen of the United States, residing at the borough of Manhattan, in the city, county, and State of New York, have invented certain new and useful Improvements in Oil and Water Separating Means, of which the following is a full, clear, and exact specification.

This invention relates to means for separating oil from water and subjecting the separated water to filtration, and my present improvements are directed to a novel apparatus, compact in form, provided with recurrent separation means, also having a plurality of filter units, presenting large surface area, with means for their convenient renewal.

Other features and advantages of my invention will hereinafter appear.

In the drawings:—

Figure 1:
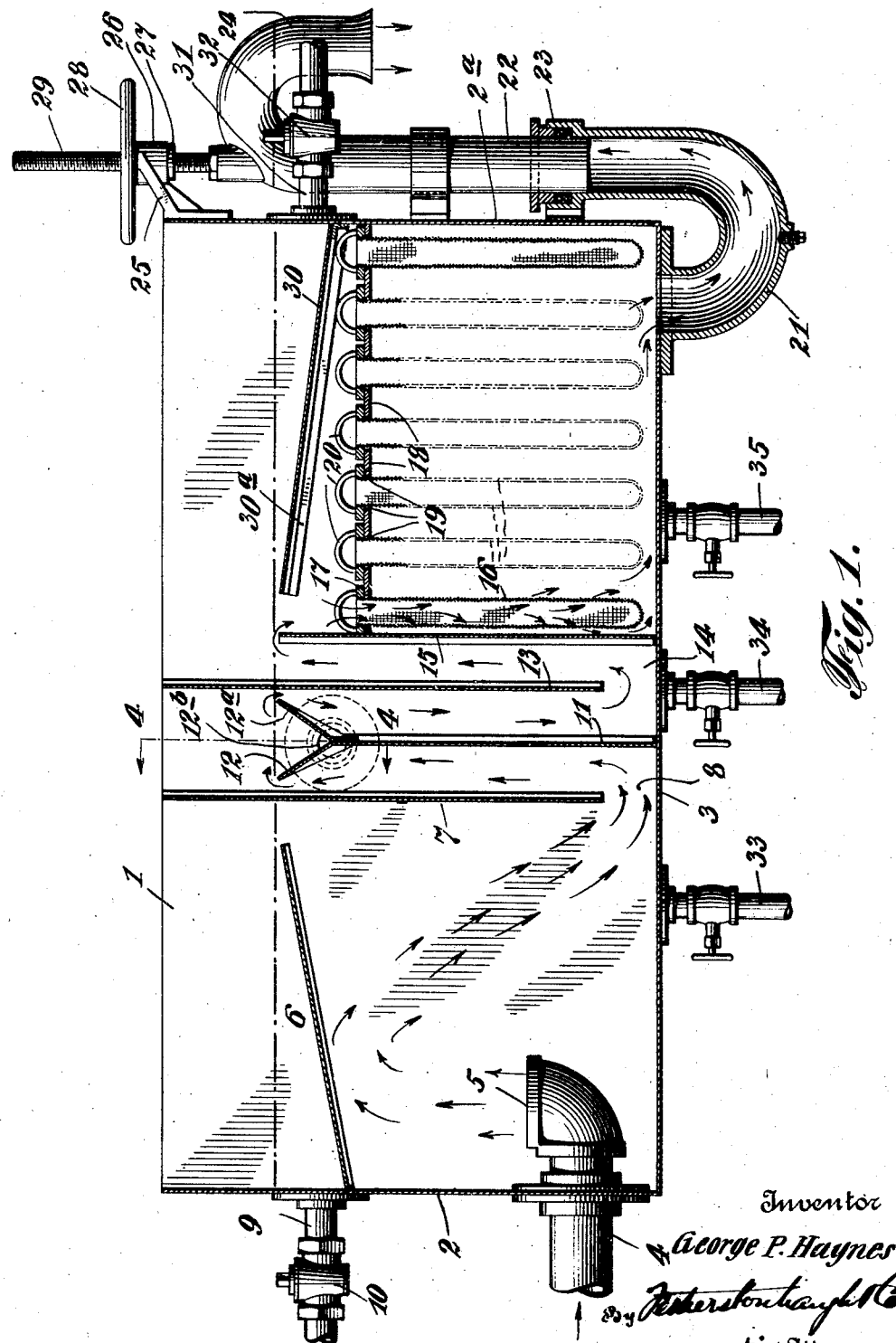
Figure 1 is a side sectional elevation of my improved apparatus.
Figure 2:
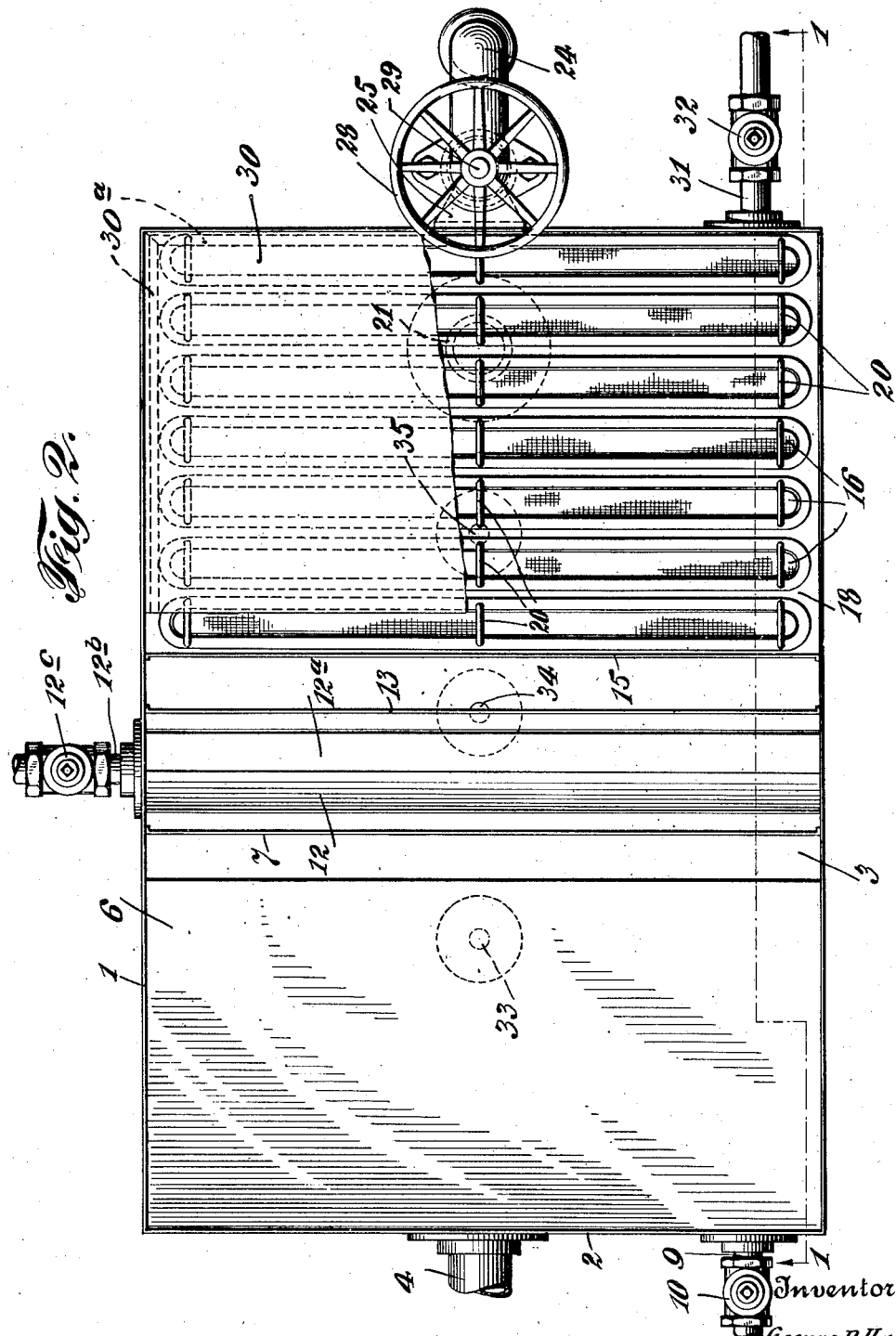
Fig. 2 is a top plan view thereof, partly broken away.
Figure 3:
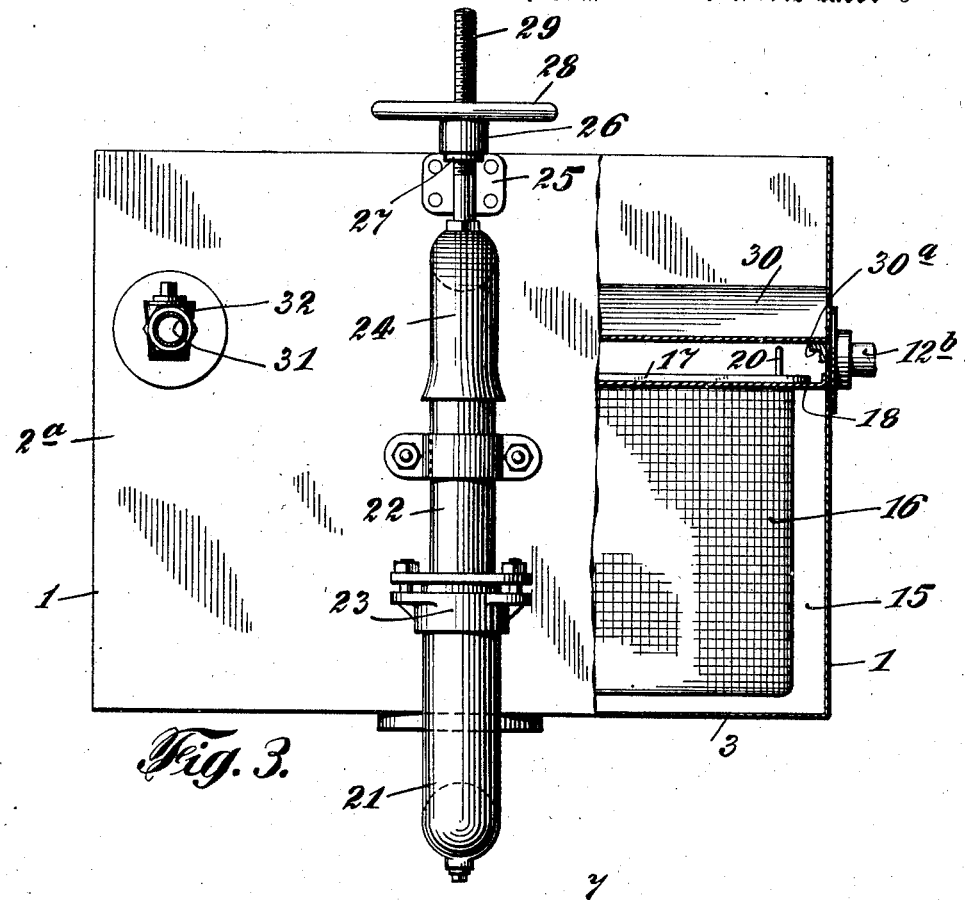
Fig. 3 is an end view, partly broken away.
Figure 4:
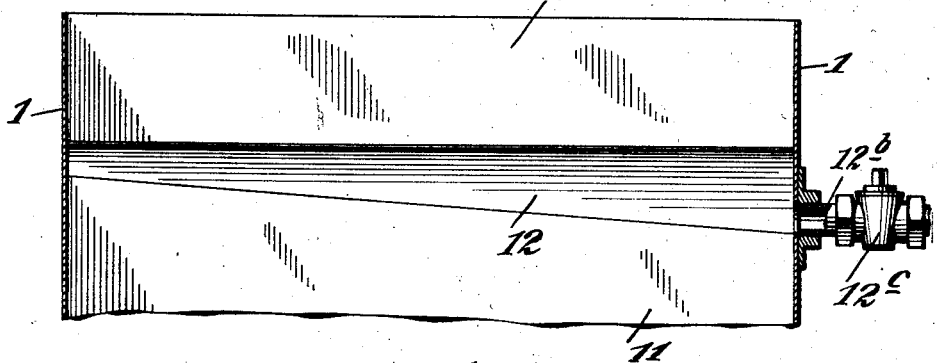
Fig. 4 is a section on the line 4—4 of Fig. 1.

In said figures I have illustrated an apparatus which is interiorly provided with means both for the separation of oil from water and for filtering the water, the apparatus also having different means for the discharge of the oil and water, as separated.

The apparatus is here shown in the form of a casing having the side walls 1, 1, end walls 2, 2ª and base 3. At one end of the apparatus, which may be termed the reception portion, there is introduced a pipe 4, by which mingled oil and water, coming from any source, is conveyed into the casing. This pipe 4 is shown as having an upturned, terminal mouth 5, within the reception portion, so that liquid issuing therefrom, under pressure, is directed upwardly until it meets a baffle 6, whereupon it falls by gravity. In this action, on account of the greater specific gravity of water, the tendency for the oil to take its position at the top of the mass is initially assisted as a first step in the separating process.

The baffle 6 is in the form of a transverse plate lying between the walls 1, 1, and extending, at an upward inclination, from the end wall 2, to a point near, but in spaced relation from, a vertical baffle 7, that lies between the walls 1, 1, but is raised above the base 3, to provide a bottom clearance 8.

Since, in obeying a natural law oil tends to collect at the top of the liquid mass in the reception portion, it will be seen that the baffle 6 will skim oil from this upper level, the oil thus caught flowing down the baffle toward end wall 2, for delivery through a discharge pipe 9, which is governed by a valve 10.

The water which has entered the reception portion along with the oil and which, due to its greater weight, tends to collect toward the bottom, will pass through clearance 8 and will be directed upwardly between baffle 7 and a succeeding, parallel, vertical baffle 11, in spaced relation with baffle 7, that extends between walls 1, 1, and connects with the base 3.

This baffle 11, at its upper end, is provided with a trough composed of the divergent walls 12, 12ª, whose base is inclined downwardly toward one of the side walls 1, where it communicates with a delivery pipe 12ᵇ, that is governed by a valve 12ᶜ.

The liquid received into the trough over wall 12 may be drawn off therefrom by means of said pipe 12ᵇ.

The overflow from the trough, passing over wall 12ª, falls to the base 3, being confined in its passage downwardly between baffle 11 and a succeeding vertical baffle 13, which extends between the walls 1, 1, but is supported with its lower edge separated from base 3, leaving a lower clearance 14 for the passage of liquid. From this clearance 14 the liquid rises between baffle 13 and a succeeding spaced, vertical baffle 15, also extended between the walls 1, 1, from the base upward, to the same height as the walls 12, 12ª, that surmount baffle 11.

The discharge end portion of the casing, intermediate baffle 15 and wall 2ª is occupied by a series of filtration units 16, here shown as each consisting of what I term a stocking or bag, composed of suitable material, such for example, as toweling. Each stocking or bag is provided at its mouth or entrance with a rigid frame 17, that extends laterally therefrom like a flange. By means of these flanges the stockings or bags may be supported upon a horizontal plate 18 that is extended across the casing, between the baffle 15, end wall 2ª and side walls 1, 1, said plate having parallel slots 19 to receive the stockings or bags, with the frames or flanges 17 resting upon the plate at the edges of the slots, so that the stockings or bags may in this manner be suspended below the plate.

The frames 17 may be provided with suitable handles, as 20, by which the units may be conveniently put into place and removed.

The high liquid level is established in the casing by means of an outlet duct composed of a U-shaped pipe 21 communicating with base 3, and a pipe length 22 vertically slidable in pipe 21, through a stuffing box 23, the pipe length 22 terminating in a gooseneck portion 24. A bracket 25, attached to the casing, carries a collar 26; and an internally threaded sleeve 27, revoluble within the collar by means of a hand-wheel 28, engages a threaded stem 29 which extends upwardly from pipe length 22, to adjust the height of the latter.

Located above the filtration units, and extending at an upward inclination from end wall 2ª, is a transverse baffle plate 30, whose free edge approaches the upper edge of baffle 15, in spaced relation therewith. The purpose of this baffle plate 30, which is removably supported by ledges 30ª, is to skim the surface of liquid delivered to the filtering compartment. An outlet pipe 31, governed by valve 32 and communicating through end wall 2ª with the reception means provided by plate 30, serves as a discharge therefor.

The reception portion of the apparatus is provided at its base with a valved drain outlet 33; the intermediate portion of the apparatus, bounded lengthwise by the baffles 11 and 15, is similarly provided with an outlet 34, and the discharge portion is similarly provided with an outlet 35.

In the operation of my invention it is found that mingled oil and water entered within the reception portion of the apparatus, whose normal liquid level is established by the goose-neck 24 will in practice, while the valves 10 and 12ᶜ are closed, attain relatively higher levels in different planes. This is on account of the viscous character of the oil that collects at the top of the liquid mass.

In the reception portion of the apparatus, where the greatest proportion of oil will be present, the highest oil level will be attained.

The water, flowing under baffle 7, and carrying with it some of the oil will flow over wall 12 into the trough and the oil contents will tend to build up a layer which rises between baffles 7 and 13 to a level which is in a lower plane than the level in the reception chamber, because the oil accumulation will be proportionately less. The water will flow out of the trough, over wall 12ª, passing thence under baffle 13 and upwardly between baffles 13 and 15. This water will carry with it a reduced oil content and will fill the filter compartment.

In this compartment, also, the oil, being at the top, will be caught by the baffle plate 30, and will build up thereon while the valve 32 remains closed, the separated water meanwhile undergoing a process of filtration in passing through the filter units 16, in transit to the delivery means 21, 22, 24.

At suitable times, when sufficient quantities of oil have accumulated above baffle 6, the trough surmounting baffle 11, and baffle 30, the respective valves 10, 12ᶜ, and 32 may be opened for the discharge thereof.

Also, when the filter units 16 become clogged up and fail to function freely, these units, or any of them, may be removed and renewed, the baffle 30 being removable for this purpose.

Variations within the spirit and scope of my invention are equally comprehended by the foregoing disclosure.

I claim:—

1. In an apparatus for separating oil from water, a casing having means for the introduction thereinto, at one end, of mingled oil and water, an outlet extending upwardly from the casing base, near its opposite end, to establish the normal liquid level, oil receiving, inclined baffle means located below the normal liquid level, and oil discharge means disposed near the lower portion of said baffle means.

2. In an apparatus for separating oil from water, a casing having means for the introduction thereinto, at one end, of mingled oil and water, an outlet extending upwardly from the casing base, near its opposite end, to establish the normal liquid level, successive baffle means for directing liquid in upward and downward directions in the casing, a succession of oil receiving, inclined baffle means located respectively below the normal liquid level, and gravity discharge means respectively for said inclined baffle means disposed near their lower portions.

3. In an apparatus for separating oil from water, the combination, in a casing, of a series of transverse vertical baffles adapted for the flow of liquid progressively in upward and downward directions, a series of downwardly inclined means in the casing arranged for the retention of oil from the liquid rising therein, valved discharge means located near the bottoms of the oil retention means, means for the introduction of mingled oil and water into the casing, and water discharge means in communication with the casing base, extended upwardly to establish the normal liquid level in the casing.

Signed at the borough of Manhattan, in the city, county and State of New York, this 29th day of November, 1922.

GEORGE P. HAYNES.